E. H. BECKER.
BATTERY.
APPLICATION FILED JUNE 20, 1916.

1,257,969.

Patented Mar. 5, 1918.

Witness
Oscar V. Payne

Inventor
EDMUND H. BECKER
By
Attorney

UNITED STATES PATENT OFFICE.

EDMUND H. BECKER, OF WASHINGTON, DISTRICT OF COLUMBIA.

BATTERY.

1,257,969.  Specification of Letters Patent.  Patented Mar. 5, 1918.

Application filed June 20, 1916. Serial No. 104,652.

*To all whom it may concern:*

Be it known that I, EDMUND H. BECKER, a citizen of the United States of America, residing at Washington, District of Columbia, have invented certain new and useful Improvements in Batteries, of which the following is a specification.

This invention relates to a new and novel means for revivifying a dry cell after the same has either stood idle for a period of time or has been in use and has become weakened.

This and other objects will be set forth in the detailed description which follows.

Referring to the drawings,

Figure 1, discloses a partial section of a battery with my preferred form of device mounted therein.

Fig. 2, discloses a perspective view of one of the capsules and

Figure 1:
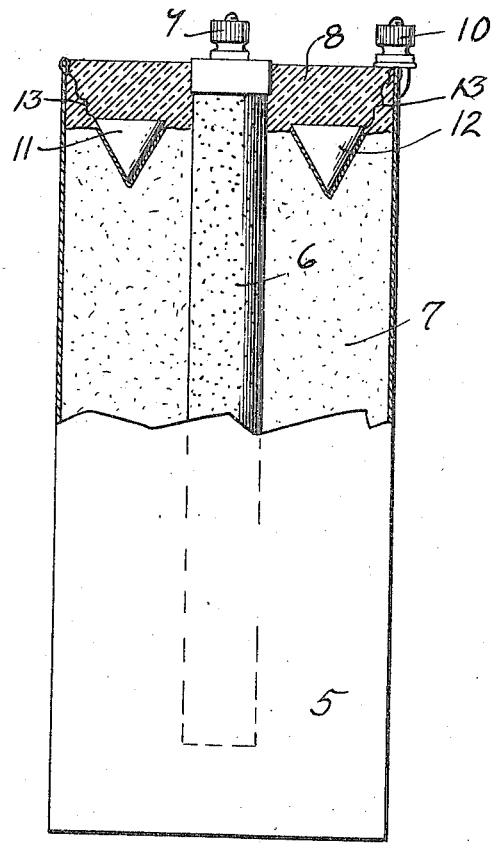
Figure 2:
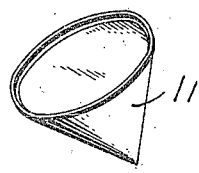
Figure 3:
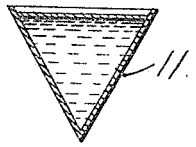
Fig. 3, is a cross section of a capsule filled with a liquid.

Referring to the drawings in detail, numeral 5 designates the outer shell or zinc cup of what is known as a standard dry cell. Numeral 6 represents a carbon electrode forming one of the elements of the battery, and 7 an electrolyte which may be formed of any well known composition. This composition is sealed into the battery by means of the usual filling 8. Numerals 9 and 10 represent the usual terminals of a dry cell. Numerals 11 and 12 represent capsules which may be made partly or wholly of a soluble metal, which is electro-positive with relation to the negative element of the cell. These capsules I preferably embed in the upper portion of the battery just before sealing. I preferably employ zinc for forming the capsules as the action of the battery after a certain period of time is such as to dissolve the zinc and liberate the contents of the capsules, which may be either water or an electrolyte. These capsules should be made of a material, which is positive to the negative element, and of varying thickness so that the action of the battery will automatically liberate the contents at any predetermined time, depending upon the result desired. These capsules are electrically connected to the zinc cup by conductors 13 passing through the sealing filling 8.

Figure 4:
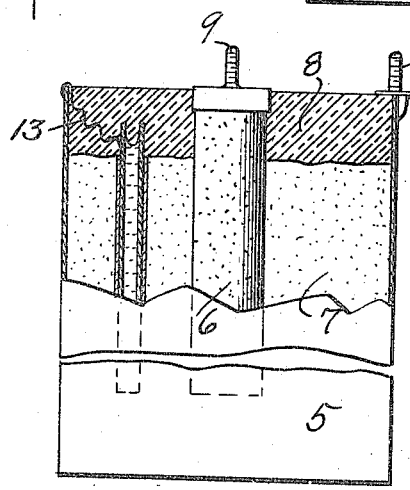
Figs. 4 and 5, are modified forms of my invention.
Figure 5:
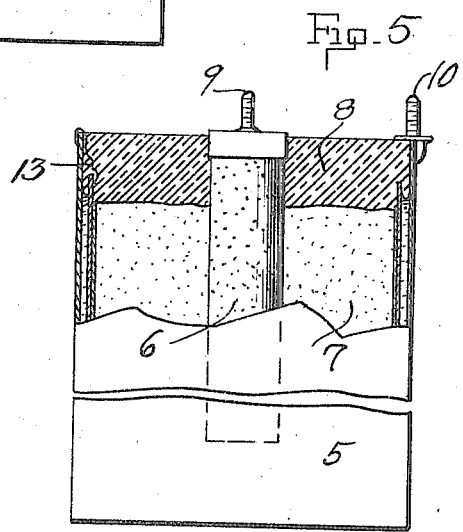

In Fig. 4 I have shown the capsule in the form of a tube paralleling the carbon element and in Fig. 5 I have shown an inner and outer wall with a revivifying agent therebetween.

It is a well known fact that dry cells are very unsatisfactory for the reason that they are very shortlived due to drying out when not in use, and when under a heavy load they very often "weep" which means a loss of moisture in the battery which results in a much shorter useful life.

With my invention it will be seen that the internal action of the battery will gradually eat through the zinc of the capsules and liberate the fluid therein which will result in the revivifying of the cell. This will be of great value as it will prevent shelf-deterioration as well as rapid deterioration from use.

Having described my invention what I claim as new and novel is:—

1. In combination with a battery cell having a metallic shell with a carbon electrode and an electrolyte therein, and a sealing filling for the shell, a capsule of soluble metal electro-positive with relation to the negative element of the cell arranged within the electrolyte and electrically connected with the said shell, said capsule containing electrolytic fluid.

2. In combination with a dry battery cell having a zinc cup with an electrolytic content and a sealing means, a fluid container partially embedded in said sealing means and surrounded by said sealing means and content, a fluid in said container and an electrical conductor between the said container and cup, the said container having a part which is soluble by corrosion caused by the electrolytic action of the cell during discharge whereby the fluid therein automatically enters the electrolyte at a predetermined time.

3. A revivifying means for a dry cell battery comprising in combination with a zinc shell, carbon electrode, an electrolytic filler and sealing means for the cell, a zinc capsule partially embedded in said sealing means entirely surrounded by said means and electrolyte and extending substantially throughout the length of the cell, fluid within the said capsule, and an electrical connector extending through said sealing means attached to said shell and capsule.

In testimony whereof I affix my signature.

EDMUND H. BECKER.